United States Patent [19]

Raman

[11] 4,160,742

[45] Jul. 10, 1979

[54] METHOD OF RESOLVING OIL-IN-WATER EMULSIONS

[75] Inventor: Manjeri S. Raman, Houston, Pa.

[73] Assignee: Calgon Corporation, Pittsburgh, Pa.

[21] Appl. No.: 916,034

[22] Filed: Jun. 15, 1978

[51] Int. Cl.$^2$ ............................................. B01D 17/04
[52] U.S. Cl. ..................................... 252/344; 526/292
[58] Field of Search ......................... 252/344; 526/292; 260/29.6 H

[56] References Cited

U.S. PATENT DOCUMENTS

| 3,661,880 | 5/1972 | Markert et al. | 526/303 X |
| 3,956,117 | 5/1976 | Bradley et al. | 210/43 |
| 4,075,183 | 2/1978 | Kawakami et al. | 526/292 X |

FOREIGN PATENT DOCUMENTS 921198  2/1973  Canada.

Primary Examiner—Benjamin R. Padgett
Assistant Examiner—E. Suzanne Parr
Attorney, Agent, or Firm—Mario A. Monaco; Martin L. Katz; Edmunde D. Riedl

[57] ABSTRACT

Use of copolymers of acrylamide and methacrylamidopropyltrimethylammmonium chloride to deemulsify oil-in-water emulsions especially in waste streams prior to their discharge from petroleum refineries, industrial plants and the like.

5 Claims, No Drawings

METHOD OF RESOLVING OIL-IN-WATER EMULSIONS

This invention relates to a method of resolving or separating emulsions of the oil-in-water type by chemical treatment. More specifically, the present invention is concerned with deemulsifying oil-in-water emulsions by treating them with minor dosages of water-soluble copolymers containing a quaternary moiety. Most particularly, this invention relates to the resolving or separating of oil-in-water emulsions into their component phases by means of the addition to the emulsion of a small but deemulsifying amount of a copolymer of acrylamide and methacrylamidopropyltrimethylammonium chloride (MAPTAC).

Oil-in-water emulsions are the type of emulsions which comprise organic oily materials which are distributed or dispersed as small drops throughout a continuous body of non-oily media. The organic oily materials which are immiscible with water or aqueous or non-oily media, in many instances form stable, difficulty separable emulsions. Often the amount of dispersed oily phase is minor in comparison to the aqueous or non-oily continuous phase, and is resistant to resolution.

The term "oil" as used herein is intended to include not only crude and refined petroleum oils, but also the various fractions derived from the processing of such oils such, for example, as obtained through hydroforming and cracking operations, as well as oils comprising the esters of fatty acids and glycerine.

An example of an economically important type of emulsion is one in which small proportions of petroleum or petroleum fractions are stably dispersed in water and/or brine non-oily continuous phases. It is essential to resolve this emulsion in order to recover the oily material substantially free of undesirable aqueous phase. Not only are emulsions found in areas of petroleum refining, but are also encountered in metal working industries, steel and aluminum rolling mills, chemical processing, food processing, and the like. Specifically, emulsions of oily matter in water or other non-oily environment are encountered in milk and mayonnaise processing, marine ballast water disposal, and furniture polish formulations. Often steam distillation and other techniques cause the above emulsions from which the valuable oil must be resolved and recovered. Such recovery is becoming important not only because of the economic importance of recovering the oil from what was heretofore discharged to waste, but also because increasingly stringent environmental standards imposed on manufacturer's mandate clean effluent.

Many oil-in-water emulsions can only be effectively broken with clean resolution of discontinuous and continuous phases, by treatment with large molecules such as long chain polymeric materials, and the present invention utilizes a novel class of water-soluble, cationic copolymeric materials derived from acrylamide and methacrylamidopropyltrimethylammonium salts.

A specific object of the invention is to provide a process of emulsion breaking by use of water-soluble high molecular weight copolymeric substances which have a wide range of applicability and are particularly effective in resolving oil-in-water emulsions of petroleum systems.

In accordance with the invention a successful method has been discovered for breaking emulsions of the type comprising an oil phase dispersed in a non-oily continuous phase such as water or such hydrophilic liquids as water-miscible alcohols, mixtures of same with water, brines and the like.

It should be understood that the aqueous phase of what is herein referred to as the water emulsion is most likely contaminated with inorganic salts or organic compounds derived from the particular industrial process involved. For example, metal halides and cyanides, as well as alcohols, ketones. These contaminants are not removed by the process of this invention and the nature of such contaminants dissolved in the aqueous phase are immaterial to the practice of this invention. In this process, it has been found that excellent separation of the oil and non-oil phases may be effected by treatment of the emulsion with at least a demulsifying amount of a copolymer of acrylamide and MAPTAC demulsifier which has a plurality of a wide variety of strongly basic quaternary cationic groupings. After such chemical treatment of the emulsion, the respective phases may be rapidly resolved into distinct layers which are then separated by any number of well-known mechanical means such as merely drawing the heavier non-oily layer away from the lighter oil fraction through gravity separation means.

The prior art is represented by U.S. Pat. Nos. 3,316,181 and 3,585,148. U.S. Pat. No. 3,316,181 discloses the use of acrylamide-diallylamine copolymers for breaking emulsions of the oil-in-water type and U.S. Pat. No. 3,585,148 discloses the use of copolymers of acrylamide and a dialkyl diallyl ammonium chloride compound for breaking emulsions of the oil-in-water type.

The copolymers useful in the practice of this invention are copolymers consisting essentially of at least 50% by weight of acrylamide and at least 2% by weight of MAPTAC. Surprisingly, it was found that the demulsifying characteristics of the copolymer of this invention are not appreciably diminished by reducing the amount of MAPTAC in the copolymer. Thus, copolymers of 90% by weight acrylamide and 10% by weight MAPTAC are especially suitable as well as the preferred copolymer consisting of 95% by weight acrylamide and 5% by weight MAPTAC. This is of particular interest since the relative cost of the monomers favors the inclusion of larger amounts of acrylamide in the copolymer so long as efficacy is not sacrificed.

The copolymers are known and can be prepared by known polymerization procedures such as solution polymerization, bead or suspension polymerization, and by oil-in-water emulsion polymerization. Any of these techniques will produce a composition useful in this invention provided the reaction parameters are adjusted to produce a polymer having a molecular weight greater than about 1,000,000. Suitable methods for preparing solution polymers are described in Canadian Pat. No. 921,198. Methods for preparing bead or suspension polymers of the compositions described herein are given in U.S. Pat. No. 2,982,749. Suitable methods for preparing oil-in-water emulsion polymers of the cationic polymers of interest are given in U.S. Pat. Nos. 4,022,731 and 3,661,881.

The polymers useful in this invention can be prepared by the means described in U.S. Pat. Nos. 4,022,731 and 3,661,881 by means of an oil-in-water emulsion polymerization process in which the monomers are emulsified in an oil phase containing at least 20% by weight, based on the oil phase, of an emulsifying agent and polymerized therein in order to obtain stable solution polymers that may be inverted upon addition to water.

The emulsifying agent may be any conventional water-dispersible emulsifying agent or mixtures thereof having an hydrophobic lipophilic balance (HLB) of at least 7. The preferred surfactants include ethoxylated nonyl phenols, ethoxylated nonyl phenol formaldehyde resin, dioctyl esters of sodium sulfosuccinate, and octyl phenyl polyethoxy ethanol can be used.

Other surfactants that may be employed include the soaps such as sodium and potassium myristate, laurate, palmitate, oleate, stearate, resinate and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of high amines like lauryl amine hydrochloride and stearyl amine hydrobromide.

Any anionic, cationic, or nonionic compound can be used as the surfactant. Examples of suitable anionic surfactants are alkali metal, ammonium and amine soaps; the fatty acid part of such soaps contain preferably at least 16 carbon atoms because soaps based on lauric and myristic acids have a great tendency to develop abundant foam.

Other examples of suitable anionic surfactants are alkali metal salts of alkyl-aryl sulfonic acids, sodium dialkyl sulfosuccinate, sulfated or sulfonated oils, e.g., sulfated castor oil; sulfonated tallow and alkali salts of short chain petroleum sulfonic acids.

Examples of suitable cationic surfactants are salts of long chain primary, secondary, or tertiary amines, such as oleylamine acetate, cetylamine acetate, didodecylamine lactate, the acetate of aminoethyl-stearamide, dilauroyl triethylene tetraamine diacetate, 1-aminoethyl-2-heptadecenyl imidazoline acetate; and quaternary salts, such as cetylpyridinium bromide, hexadecyl ethyl morpholinium chloride, and diethyl didodecyl ammonium chloride.

Examples of suitable nonionic surfactants are condensation products of higher fatty alcohols with ethylene oxide, such as the reaction product of oleyl alcohol with 10 ethylene oxide units; condensation products of alkyl phenols with ethylene oxide, such as the reaction products of isoctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonethyleneglycol monostearate, nonethyleneglycol dioleate, tridecaethyleneglycol monoarachidate, tricosaethylene glycol monobehenate, tricosaethyleneglycol dibehenate, polyhydric alcohol partial higher fatty acid esters such as sorbitan tristearate, ethylene oxide condensation products of polyhydric alcohol partial higher fatty esters, and their inner anhydrides (mannitolanhydride, called Mannitan, and sorbitolanhydride, called Sorbitan), such as glycerol monopalmitate reacted with 10 molecules of ethylene oxide, pentaerythritol monooleate reacted with 12 molecules of ethylene oxide, sorbitan monostearate, reacted with 10 to 15 molecules of ethylene oxide; long chain polyglycols in which one hydroxyl group is esterified with a higher fatty acid and the other hydroxy group is etherified with a low molecular alcohol, such as methoxypolyethylene glycol 550 monostearate (550 meaning the average molecular weight of the polyglycol ether).

A combination of two or more of these surfactants may be used; e.g., a cationic may be blended with a nonionic or an anionic with a nonionic.

Following is a list of suitable surfactants that could be used in the practice of this invention. Any water-dispersible surfactant could be used, but naturally some are more efficient than others. Useful surfactants include, but are not limited to, sorbitan sesquioleate, polyoxyethylene alkyl phenol, polyoxyethylene (10 mole) cetyl ether, polyoxyethylene alkylaryl ether, polyoxyethylene monolaurate, polyoxyethylene vegetable oil, polyoxyethylene sorbitan monolaurate, polyoxyethylene (40 mole) sorbitol hexaoleate, polyoxyethylene esters of mixed fatty and resin acids, polyoxyethylene sorbitol lanolin derivative, polyoxyethylene (12 mole) tridecyl ether, polyoxyethylene sorbitan esters of mixed fatty and resin acids, polyoxyethylene sorbitan monostearate, polyoxyethylene sorbitan monooleate, polyoxyethylene monostearate, polyoxyethylene (20 mole) stearyl ether, polyoxyethylene (20 mole) oleyl ether, polyoxyethylene (15 mole) tridecyl ether, polyoxyethylene fatty alcohol, polyoxyethylene alkyl amine, polyoxyethylene glycol monopalmitate, polyoxyethylene sorbitan monopalmitate, polyoxyethylene (20 mole) cetyl ether, polyoxyethylene oxypropylene stearate, polyoxyethylene lauryl ether, polyoxyethylene lanolin derivative, sodium oleate, quaternary ammonium derivative, potassium oleate, N-cetyl N-ethyl morpholinium ethosulfate, and pure sodium lauryl sulfate. Prior art processes, as illustrated by U.S. Pat. No. 3,284,393, utilize significantly lower amounts of emulsifying agents and produce products that are less storage stable and have less freeze/thaw stability.

The oil phase may be any inert hydrophobic liquid. A preferred group of organic liquids are the hydrocarbon liquids which include both aromatic and aliphatic compounds. Thus, such organic hydrocarbon liquids as benzene, xylene, toluene, mineral oils, mineral spirits, kerosenes, naphthas and, in certain instances, petrolatums may be used. Preferred oils include Mentor 28, a high boiling paraffinic mineral oil marketed by Exxon and Soltrol 200 and Soltrol 220, high boiling paraffinic mineral oils marketed by Phillips Petroleum Company.

The amount of oil used in relation to the water to prepare the emulsion may be varied over wide ranges. As a general rule, the amount of water-to-oil may vary between 5:1 to 1:10 with the preferred amount of water-to-oil being in the ratio of 1:1 to 1:10. These ratios are illustrative of emulsions that can be prepared, although it should be understood that the invention is not limited thereby.

Any free radical initiators such as t-butyl peroxy pivalate, benzoyl peroxide, lauroyl peroxide, potassium and ammonium persulfate may be used in amounts ranging from about 0.0000001 to 1 mole percent. Other mechanisms of initiation such as photolytic or thermal means may be used and still be within the scope of this invention.

The reaction may be carried out at temperatures of from about 0° C. to about 100° C. The preferred range, however, is from about 25° C. to about 75° C. The reaction also may be conducted under subatmospheric or superatmospheric conditions.

A typical procedure may be described as follows. The water-in-oil emulsifying agent is dispersed in the oil phase, while the free radical initiator, when one is used, is dissolved in the oil or monomer phase, depending upon whether an oil or water-soluble initiator is used.

An aqueous solution of monomer or mixed monomers or monomer per se is then added to the oil phase with agitation until the monomer phase is emulsified in the oil phase, and the reaction is carried out as indicated above. The order of addition of reaction media ingredients is not important. The reaction is continued with agitation until conversion is substantially complete. A polymeric latex is thereby obtained. It should be noted that there are many variations of the aforementioned procedure that may be utilized. For example, an emulsion of the monomer may be formed and fed incrementally or continuously to a "heel" of the emulsion in the reactor. A batch process in which all components are combined initially is also a practical procedure.

The polymers used in my invention have molecular weights of at least 1,000,000, preferably at least 2,500,000. Normally, at least 10 ppm of copolymer based on the weight of the emulsion, and preferably 20-40 ppm of copolymer based on the weight of the emulsion is employed for most applications.

EXAMPLE I

At an oil refinery a dissolved Air Flotation Unit is employed to float the particulate matter from the effluent from the biological treatment. For this application, the evaluation is as follows:

A series of jar tests are run in the oily waste water obtained from an oil refinery to compare the performance of the commercially available cationic copolymers and the product of this invention. Each test is performed by adding the treating reagents as quickly as possible to waste water while stirring the water at 100 rpm. After the chemical is added, the treated waste water is agitated in the following sequence:

2 minutes at 100 rpm
5 minutes at 40 rpm
5 minutes at 0 rpm

The table below shows the results of flocculation and flotation or settling characteristics. The letter designations for various polymers are as follows:

A. A copolymer of by weight, 75% dimethyldiallylammonium chloride and 25% acrylamide.

B. A terpolymer of, by weight, 70% acrylamide, 27.5% dimethyldiallylammoniumchloride and 2.5% diethyldiallylammonium chloride.

C. A copolymer of, by weight, 95% dimethyldiallylammonium chloride and 5% acrylamide.

D. A homopolymer of, dimethyldiallylammonium chloride.

E. The product of this invention, a copolymer of acrylamide and MAPTAC with a ratio of 90/10 weight composition of acrylamide/MAPTAC.

| Polymer | Dosage ppm | Floc Settling/Floating Characteristics | Supernatant Clarity |
|---|---|---|---|
| A | 10 | Fair | Fair |
| A | 30 | Good | Good |
| B | 10 | Poor | Poor |
| B | 30 | Fair | Poor |
| E | 10 | Poor | Poor |
| C | 30 | Poor | Poor |
| D | 10 | Poor | Poor |
| D | 30 | Poor | Poor |
| E | 10 | Good | Good |
| E | 15 | Good | Good |
| E | 5 | Excellent | Excellent |

EXAMPLE II

At a waste treatment plant, waste water containing emulsified oil is treated in the Dissolved Air Flotation Unit using Chemical Flotation Aids. Several cationic polymers are evaluated along with the product of this invention, a copolymer of acrylamide and MAPTAC for this application. Both polymer and alum were required for floating the oil. The evaluation was as follows.

A series of jar tests are run in the oil waste water to compare the performance of the commercially available cationic copolymers and the product of this invention. Each test is performed by adding the treating reagents as quickly as possible to waste water while stirring the water at 100 rpm. After the chemical is added, the treated waste water is agitated in the following sequence:

2 minutes at 100 rpm
5 minutes at 40 rpm
5 minutes at 0 rpm

The table below shows the results of flocculation and flotation or settling characteristics. The letter designations for various polymers are as follows:

A. A copolymer of, by weight, 75% dimethyldiallylammonium chloride and 25% acrylamide.

B. A terpolymer of, by weight, 70% acrylamide, 27.5% dimethyldiallylammonium chloride and 2.5% diethyldiallylammonium chloride.

C. An unhydrolyzed copolymer of, by weight, 95% dimethyldiallylammonium chloride and 5% acrylamide.

D. An unhydrolyzed homopolymer of dimethyldiallylammonium chloride.

E. The product of this invention, a copolymer of acrylamide and MAPTAC with a ratio of 90/10 weight composition of acrylamide MAPTAC.

| Polymer | Dosage ppm | Floc Settling/Floating Characteristics | Supernatant Clarity |
|---|---|---|---|
| A | 40 | Poor | Poor |
| A | 60 | Poor | Poor |
| B | 40 | Poor | Poor |
| B | 60 | Poor | Poor |
| C | 40 | Poor | Poor |
| C | 60 | Poor | Poor |
| D | 40 | Fair | Fair |
| D | 60 | Good | Good |
| E | 10 | Good | Good |
| E | 15 | Excellent | Excellent |

EXAMPLE III

At a waste treatment plant at an oil refinery, the waste water containing oil is treated in the Dissolved Air Flotation Cell using chemical flotation aids. The evaluation is as follows:

A series of jar tests are run in the oil waste water to compare the performance of the commercially available cationic copolymers and the product of this invention. Each test is performed by adding the treating reagents as quickly as possible to the waste water while stirring the water at 100 rpm. After the chemical is added, the treated waste water is agitated in the following sequence:

2 minutes at 100 rpm
5 minutes at 40 rpm
5 minutes at 0 rpm

The table below shows the results of flocculation and flotation or settling characteristics. The letter designations for various polymers are as follows:

A. A copolymer of, by weight, 75% dimethyldiallylammonium chloride and 25% acrylamide.

B. A terpolymer of, by weight, 70% acrylamide, 27.5% dimethyldiallylammonium chloride and 2.5% diethyldiallylammonium chloride.

C. A copolymer of, by weight, 95% dimethyldiallylammonium chloride and 5% acrylamide.

D. An unhydrolyzed homopolymer of dimethyldiallylammonium chloride.

E. The product of this invention, a copolymer of acrylamide and MAPTAC with a ratio of 90/10 weight composition of acrylamide/MAPTAC.

| Polymer | Dosage ppm | Floc Settling/Floating Characteristics | Supernatant Clarity |
|---------|------------|----------------------------------------|---------------------|
| A | 5 | Fair | Fair |
| A | 10 | Good | Good |
| A | 25 | Good | Good |
| B | 5 | Fair | Fair |
| B | 10 | Fair | Fair |
| B | 25 | Good | Good |
| C | 5 | Poor | Poor |
| C | 10 | Poor | Poor |
| C | 15 | Poor | Poor |
| D | 10 | Poor | Poor |
| D | 15 | Fair | Fair |
| D | 20 | Fair | Fair |
| E | 2 | Fair | Fair |
| E | 3 | Good | Fair |
| E | 4 | Good | Good |

EXAMPLE IV

At an oil refinery, the oily waste water containing approximately 20–500 ppm of hydrocarbon oil coming out of their air pressure injection separators was treated with five of Calgon's cationic copolymers and the product of this invention, a copolymer of acrylamide and MAPTAC in DAF units. The evaluation is as follows:

A series of jar tests were run in the oily waste water to compare the performance of the commercially available cationic copolymers and the product of this invention. Each test was performed by adding the treating reagents as quickly as possible to waste water while stirring the water at 100 rpm. After the chemical was added, the treated waste water was agitated in the following sequence:

2 minutes at 100 rpm
5 minutes at 40 rpm
5 minutes at 0 rpm

The table below showing the results of flocculation and flotation or settling characteristics. The letter designations for various polymers are as follows:

A. A copolymer of, by weight, 75% dimethyldiallylammonium chloride and 25% acrylamide.

B. A terpolymer of, by weight, 70% acrylamide, 27.5% dimethyldiallylammonium chloride and 2.5% diethyldiallylammonium chloride.

C. A copolymer of, by weight, 95% dimethyldiallylammonium chloride and 5% acrylamide.

D. An unhydrolyzed homopolymer of dimethyldiallylammonium chloride.

E. The product of this invention, a copolymer of acrylamide and MAPTAC with a weight composition of 90/10 acrylamide MAPTAC.

F. The product of this invention, a copolymer of acrylamide/MAPTAC with 95/5 weight composition.

| Polymer | Dosage ppm | Floc Settling/Floating Characteristics | Supernatant Clarity |
|---------|------------|----------------------------------------|---------------------|
| A | 5 | Good | Good |
| A | 10 | Good | Good |
| B | 5 | Fair | Fair |
| B | 10 | Good | Fair |
| C | 5 | Fair | Fair |
| C | 10 | Fair | Fair |
| D | 5 | Poor | Poor |
| D | 10 | Poor | Poor |
| E | 3 | Excellent | Excellent |
| E | 5 | Excellent | Excellent |
| E | 10 | Excellent | Excellent |
| F | 5 | Good | Good |
| F | 10 | Good | Good |

What is claimed is:

1. A method of breaking oil-in-water emulsions which comprises the steps of treating the emulsion with at least a deemulsifying amount of a copolymer of acrylamide and methacrylamidopropyl trimethylammonium chloride where said copolymer is at least 50% by weight acrylamide.

2. A method as in claim 1 wherein said copolymer is at least 90% by weight acrylamide and at least 2% by weight methacrylamidopropyl trimethylammonium chloride.

3. A method as in claim 2 wherein said acrylamide is 90% by weight and the methacrylamidopropyl trimethylammonium chloride is 10% by weight of said copolymer.

4. A method as in claim 2 wherein said acrylamide is 95% by weight and the methacrylamidopropyl trimethylammonium chloride is 5% by weight of said copolymer.

5. A method according to claim 2 wherein 20 to 40 parts by weight of copolymer is employed per million parts by weight of emulsion.

* * * * *